United States Patent
Skistimas et al.

(10) Patent No.: US 7,386,808 B2
(45) Date of Patent: Jun. 10, 2008

(54) APPARATUS AND METHOD FOR SELECTING ACTIONS FOR VISUALLY ASSOCIATED FILES AND APPLICATIONS

(75) Inventors: Ken Skistimas, El Sobrante, CA (US); Robert Cook, San Francisco, CA (US)

(73) Assignee: Applied Minds, Inc., Glendale, CA (US)

( * ) Notice: Subject to any disclaimer, the term of this patent is extended or adjusted under 35 U.S.C. 154(b) by 666 days.

(21) Appl. No.: 10/854,045

(22) Filed: May 25, 2004

(65) Prior Publication Data

US 2005/0268250 A1    Dec. 1, 2005

(51) Int. Cl.
*G06F 17/00* (2006.01)
*G06F 9/00* (2006.01)
(52) U.S. Cl. ............... 715/810; 715/769; 715/762; 715/770; 715/748; 715/835
(58) Field of Classification Search ............ 715/810, 715/762, 769, 770, 748, 835, 779
See application file for complete search history.

(56) References Cited

U.S. PATENT DOCUMENTS 6,433,800 B1 *    8/2002    Holtz .................... 715/835

\* cited by examiner

*Primary Examiner*—Doug Hutton
*Assistant Examiner*—Daeho D Song
(74) *Attorney, Agent, or Firm*—Michael A. Glenn; Glenn Patent Group

(57) ABSTRACT

An apparatus and a method for use within a graphical user interface visually associate a graphical representation of a file and a graphical representation of an application, and select an action from a menu appearing in proximity to the association. In the invention, selecting a file icon or file listing with a pointing device and drags it to an application icon or taskbar button. As the file icon is dragged over the application icon, a menu appears listing actions that can be taken on the file by the selected application. The user can select an action listed in the menu by dragging the file icon over the action. Releasing the button over the selected action causes the application to take that action on the file.

10 Claims, 4 Drawing Sheets

APPARATUS AND METHOD FOR SELECTING ACTIONS FOR VISUALLY ASSOCIATED FILES AND APPLICATIONS

BACKGROUND

1. Technical Field

The invention relates to an improved graphical user interface. In particular, the invention relates to an improved apparatus and method for selecting actions for applications to perform on files.

2. Description of the Prior Art

A graphical user interface (GUI) is used on most computers to present information to users in an easily understood form. The GUI is also used to accept commands and information from the user. Although there are several types of GUIs, they typically share certain methods of operation, including the use of a pointing device, e.g. a mouse, a keyboard touchpad, or a trackball. These pointing devices allow a user to point to an object intuitively, e.g. a file or application, on the computer display and to select the object by pressing a button on the pointing device. In many cases the object can be dragged across the display with the pointing device, for example by continuously pressing the mouse button while the mouse is moved.

The following terms will be used in the context of this description:

An application is a program that operates on one or more files.

A file is a distinct collection of information that has typically been created with and operated on by an application.

A desktop is the visual background of a GUI; application windows are opened on top of the desktop.

An icon is a visual representation of a file or application, commonly placed on a desktop or in a taskbar which shows running applications.

Under most GUIs, files and applications are usually represented on the computer display in one of several ways. An application may be represented by a desktop icon, which the user can click on to start the application. A file can also be represented by a desktop icon, which the user can click on to start the appropriate application opened to that file. An application that is currently running is often represented on a taskbar, which displays all running applications as buttons for easy selection. Both icons and taskbar buttons can be pointed to and selected with the pointing device.

Several GUIs offer a feature in which a file is dragged onto a compatible application, which then performs a default action on the file. For example, if a document file icon, representing a text based file, is dragged onto an application icon representing a word processor or other compatible application, the application opens within a window and displays the selected file. If the same document file icon is dragged onto a printer icon, a printer application may open a print dialog window from which the user can print the file. If the document file icon is dragged onto a directory icon, the file may be moved or copied to that directory.

The action taken on the file in this manner is limited to one default action defined for the pairing of the file and a compatible application. Although there are typically several common actions that may be taken on a file, for any actions other than the default action the user must first open the application to the desired file and then select the desired action. It would therefore be desirable to allow a user to select, via the GUI, from several actions appropriate to the file and application pairing, obviating the need to open the application and load the file manually. Additionally, it would be advantageous to retain the current behavior and to apply the added functionality without adding complexity.

SUMMARY

An apparatus and a method are disclosed within a graphical user interface that allow a user to select an appropriate action for a pairing of a file and an application. In the invention, a user selects a graphical representation of a file and pairs it with a graphical representation of an application. The pairing of a compatible file and application generates a menu of actions, from which the user can select without first having to open the application. In the preferred embodiment, the user manipulates a mouse or other pointing device to select a file icon and drags it onto an application icon on the desktop or taskbar. As the file is dragged over the compatible application, a menu is displayed in proximity to the application icon with a list of actions appropriate to the selected file.

The invention therefore provides an enhanced graphical user interface, by way of an improved apparatus and method for selecting actions from a pairing of a file and application.

DESCRIPTION

The invention provides an improved graphical user interface which displays a menu of actions in response to a user's visually associating a graphical representation of a file with a graphical representation of an application.

Figure 1:
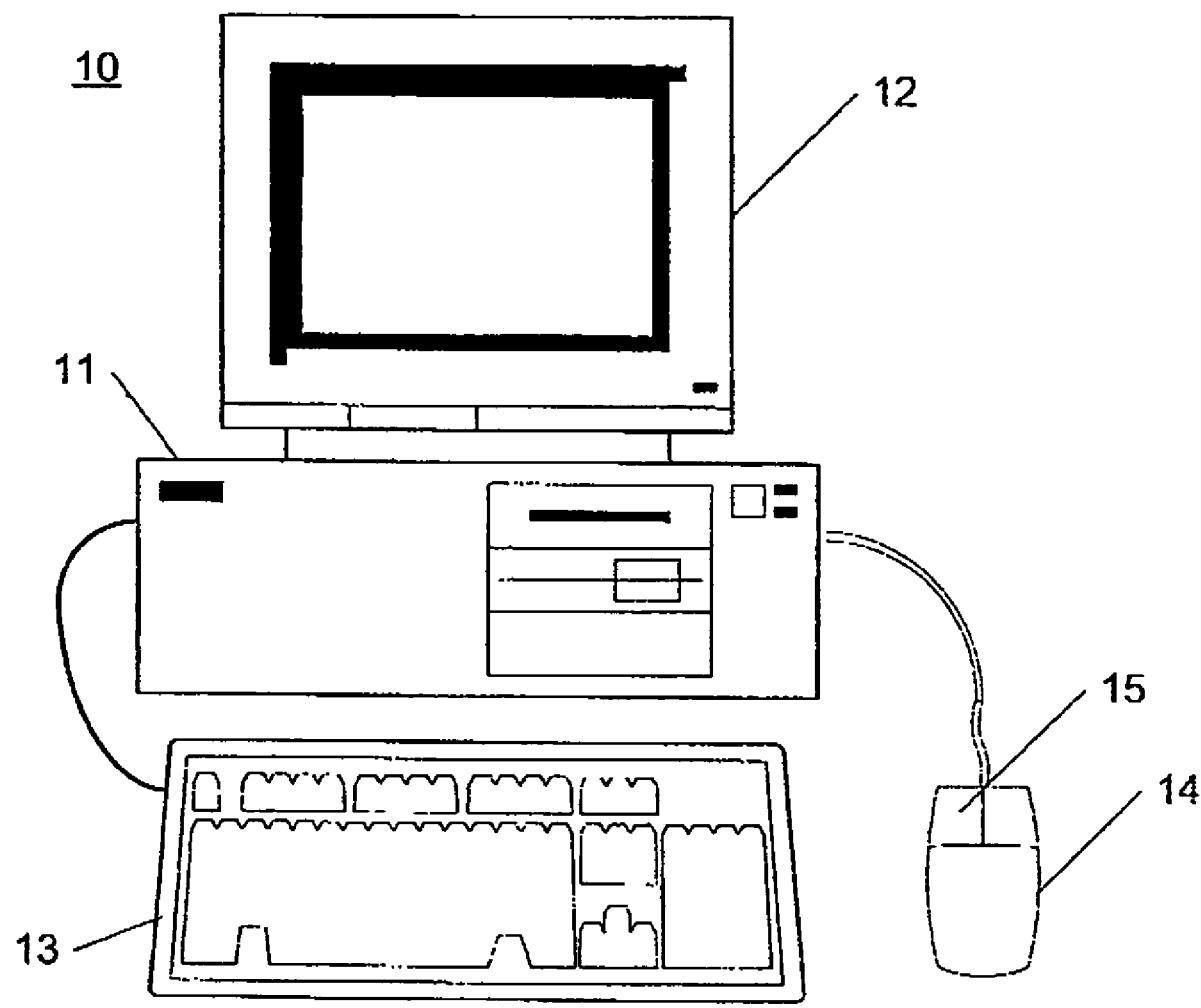
FIG. 1 depicts a computer system according to a preferred embodiment of the invention.

FIG. 1 depicts a computer system according to a preferred embodiment of the invention, in which the computer system 10 includes a processor 11, a display device 12, a keyboard 13, a pointing device 14, and a pointing device button 15. The processor 11 receives input data from input devices, such as the keyboard 13 and pointing device 14, and presents output data to a user via the display device 12. The pointing device 14 is preferably uses in conjunction with a graphical user interface (GUI) in which hardware components and software objects are controlled through the selection and the manipulation of associated graphical objects displayed on the display device 12. Although in this figure the pointing device 14 is depicted as a mouse, other pointing devices such as a joystick, track ball, touch pad, virtual keyboard, or eye tracking device can also be used.

Figure 2:
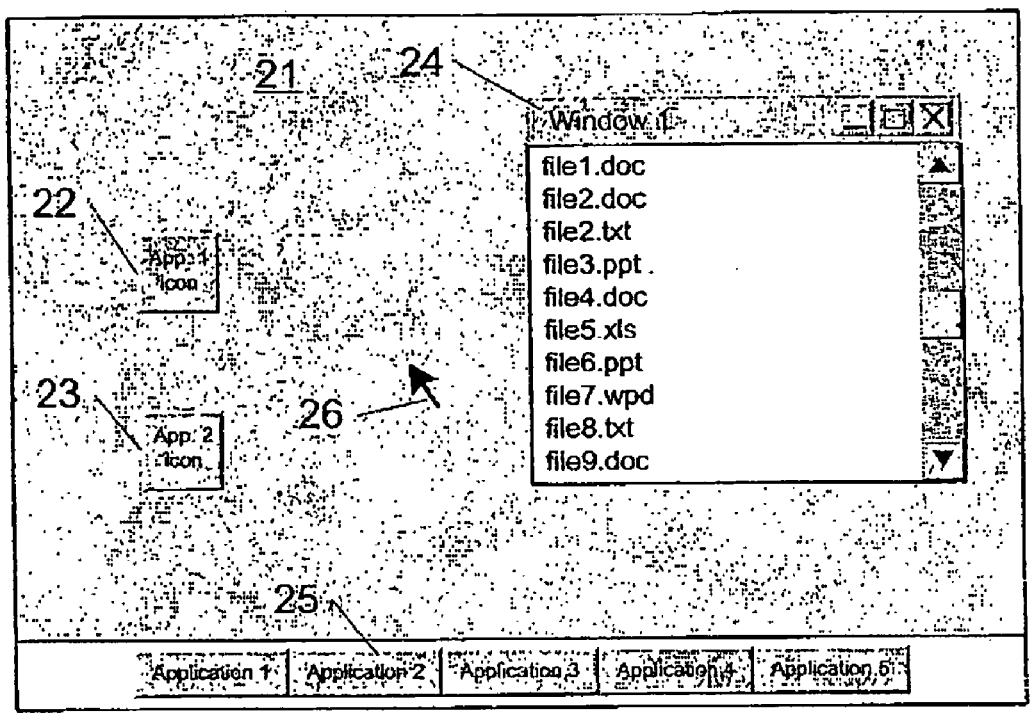
FIG. 2 depicts a computer display of a graphical user interface with icons and a taskbar representing files and applications according to a preferred embodiment of the invention.

FIG. 2 depicts a computer display of a graphical user interface with icons and a taskbar representing files and applications, according to a preferred embodiment of the invention. The GUI is displayed on the display device 12. Elements of the GUI depicted in FIG. 2 include the desktop 21, application icons 22 and 23 providing graphical representations of applications, an open application window 24, a taskbar 25, and a visual indication 26 of a pointing device, e.g. a cursor. The GUI depicted in FIG. 2 should not be construed as a limiting feature of the invention. The invention can be effectively implemented in many embodiments of graphical user interfaces.

Figure 3:
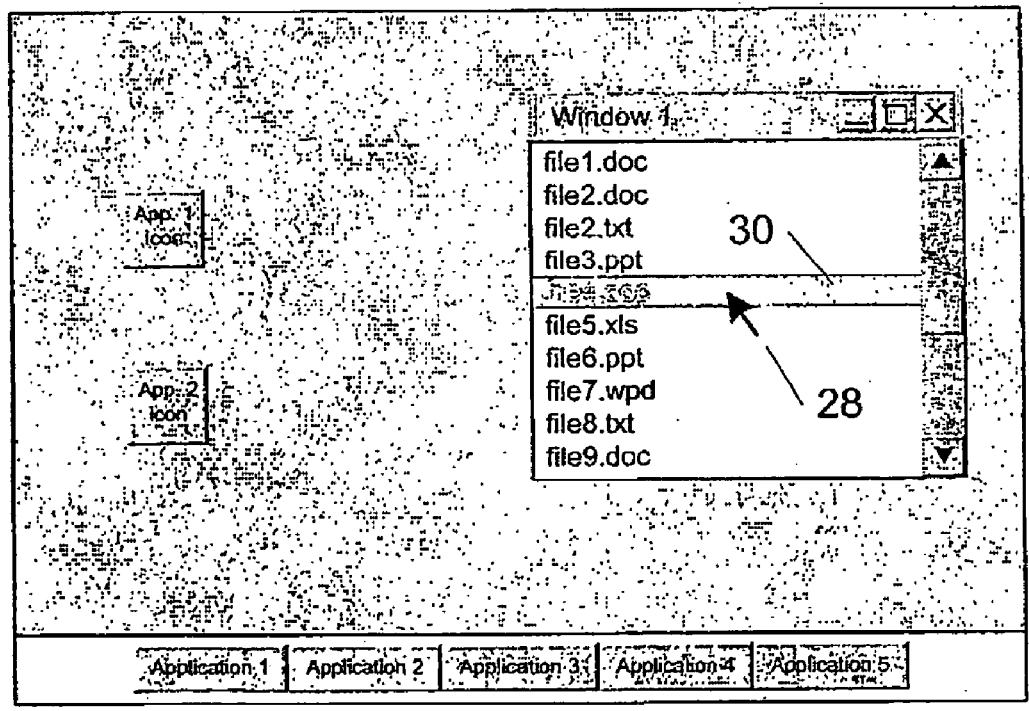
FIG. 3 depicts the graphical user interface of FIG. 2 wherein a file has been selected with a pointing device.

FIG. 3 illustrates the graphical user interface of FIG. 2 wherein a file has been selected with a pointing device. This depicts the first step in one technique of pairing the file and application, where the file 30 is selected by moving the cursor 26 over the file and clicking the pointing device button 15, which results in a visual indication of selection.

Figure 4:
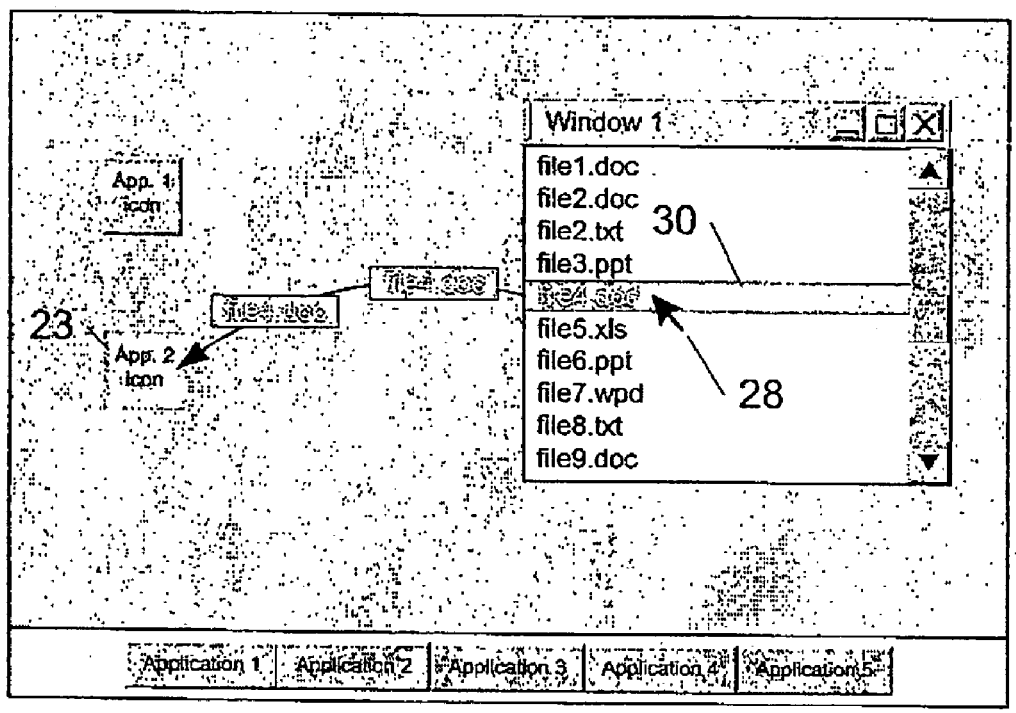
FIG. 4 depicts a select, drag, and drop operation of a file onto an application icon according to a preferred embodiment of the invention.

FIG. 4 depicts a select, drag, and drop operation of a file onto an application icon according to a preferred embodiment of the invention. The file 30 is dragged to the application icon 23 by continuously holding the pointing device button 15 while using the pointing device 14 to move the cursor 26. The application icon 23 can represent any program residing on the computer system 10, but here it is depicted as representing a program designed to list files and directories. A visual representation of the selected file moves with the cursor to the application icon, and the application icon takes on a visual indication of selection when the file is dragged over it.

Figure 5:
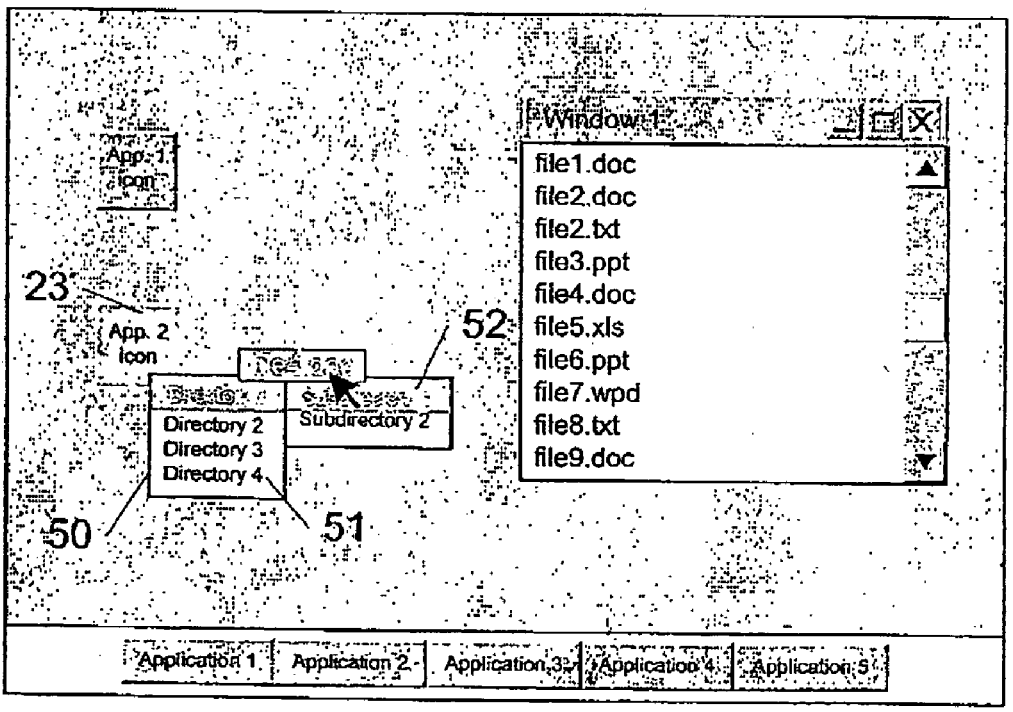
FIG. 5 depicts a menu listing possible actions in proximity to an application icon according to a preferred embodiment of the invention.

FIG. 5 depicts a menu listing possible actions in proximity to an application icon according to a preferred embodiment of the invention. The menu 50 opens in proximity to the application icon when a file is held over the application icon for a short span of time. The menu lists several possible actions that the selected application 23 can perform on the selected file 30. As depicted in FIG. 5, the file has been dragged to a file listing application. As a result, the menu shows available directories 51. As the file is placed over each entry in the menu with the button 15 still pressed, a visual indication shows selection of each entry, which in this depiction is a dark background with light text. If the selected directory has subdirectories within it, an adjacent list box opens and displays the appropriate subdirectories 52, which can also be selected. Releasing the button 15 while the cursor and file icon are over an action causes the application program to take the selected action. In FIG. 5, the action consists of the file listing application moving or copying the selected file into the selected directory or subdirectory.

Figure 6:
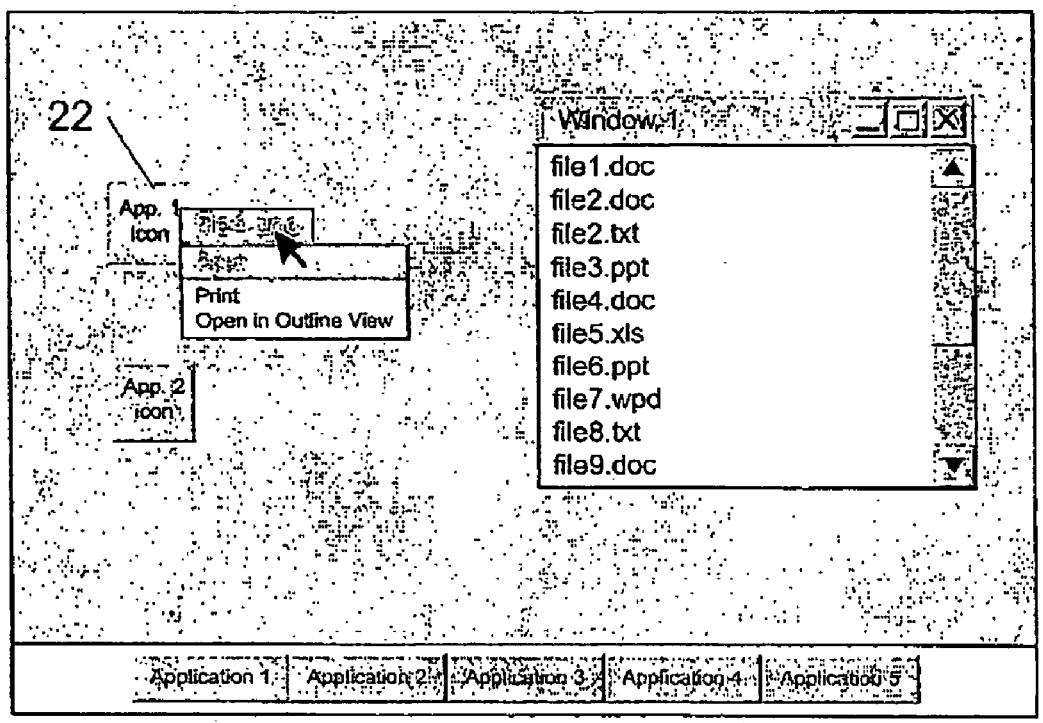
FIG. 6 depicts a menu listing possible actions in proximity to another application icon according to a preferred embodiment of the invention.

FIG. 6 depicts a menu listing possible actions in proximity to another application icon according to a preferred embodiment of the invention. In this depiction, the application icon 22 represents a word processing program. The menu in this depiction lists the actions 'Open', 'Print', or 'Open in Outline View.'

Figure 7:
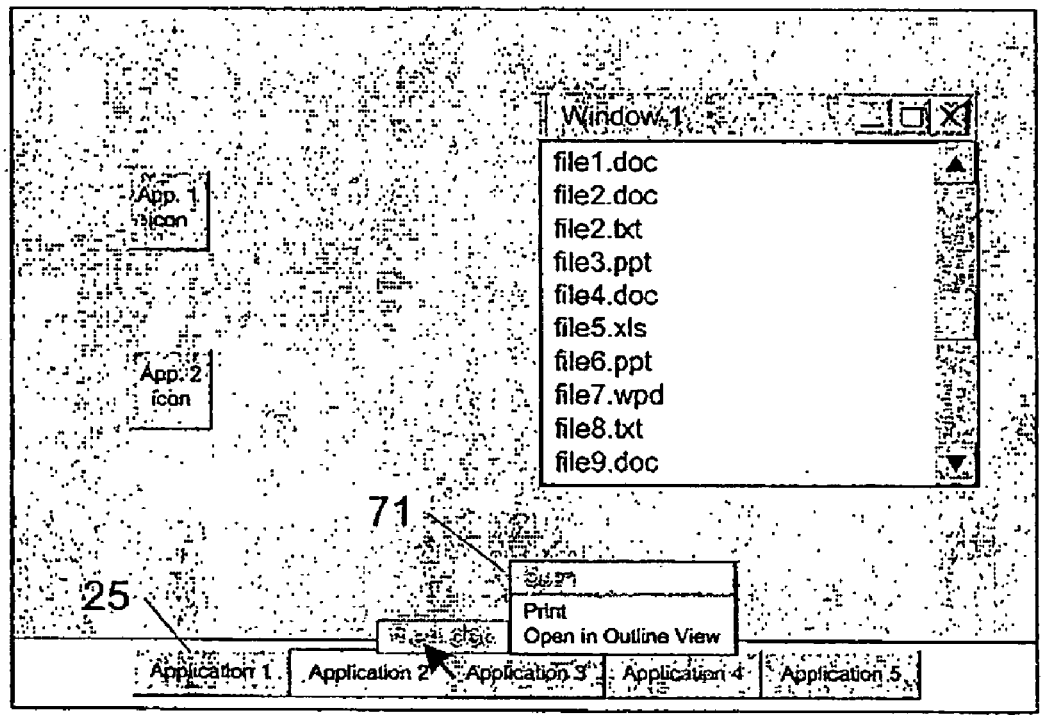
FIG. 7 depicts a menu listing possible actions in proximity to a running application minimized on the taskbar according to a preferred embodiment of the invention.

FIG. 7 depicts a menu listing possible actions in proximity to a running application minimized on the taskbar according to a preferred embodiment of the invention. In a manner similar to that depicted in FIGS. 5 and 6, the file 30 is dragged to a minimized application graphically represented by a button 27 on the taskbar. This opens a menu 71 in proximity to the taskbar button, and possible actions are selected in the same manner as described above for FIGS. 5 and 6.

Although the invention is described herein with reference to several embodiments, including the preferred embodiment, one skilled in the art will readily appreciate that other applications may be substituted for those set forth herein without departing from the spirit and scope of the invention. Accordingly, the invention should only be limited by the following claims.

The invention claimed is:

1. A computer implemented apparatus for selecting an action for a file and application pairing, comprising:
    a processor;
    a display device, communicatively coupled with said processor;
    means for depicting a graphical user interface (GUI) on said display device, said graphical user interface providing at least one graphical representation of a file and at least one graphical representation of an application; and
    a pointing device communicatively coupled with said processor; said pointing device implementing a visual association of said at least one graphical representation of a file with said at least one graphical representation of an application, wherein said visual association is performed by dragging said at least one graphical representation of a file to said at least one graphical representation of an application, and wherein said visual association results in pairing said file and application;
    wherein upon said visual association of said at least one graphical representation of a said file with said at least one graphical representation of said application said processor causes said GUI to display menu of actions, said menu associated with said file and application pairing; and
    wherein upon selection of an action from said menu, said application represented by said at least one graphical representation of an application performs said action on said file represented by said at least one graphical representation of said life.

2. The apparatus of claim 1, wherein said selection is performed by selecting a button on said pointing device, and wherein said selection is visually indicated on said GUI.

3. The apparatus of claim 1, wherein said menu is displayed in proximity to said at least one graphical representation of an application.

4. The apparatus of claim 1, wherein dragging said at least one graphical representation of a file over said menu causes a visual indication of menu selection.

5. The apparatus of claim 1, wherein a menu item designated by said selection of an action is activated by releasing said button on said pointing device.

6. The apparatus of claim 1, wherein the at least one graphical representation of a file is a file icon.

7. The apparatus of claim 1, wherein the at least one graphical representation of a file is a file listing in a file listing application.

8. The apparatus of claim 1, wherein the at least one graphical representation of an application is an application icon.

9. The apparatus of claim 1, wherein the at least one graphical representation of an application is a taskbar button.

10. A method for use within a graphical user interface for visually associating a graphical representation of a file with a graphical representation of an application and causing a menu to appear with actions that said application is capable of performing on said file, said method comprising the steps of:
    selecting a graphical representation of a file with a pointing device;
    dragging said graphical representation of a file to said graphical representation of an application with said pointing device, wherein said visual association results in a pairing between said file and said application;
    selecting an action from said menu appearing in proximity to said graphical representation of an application with said pointing device; and
    using said pointing device to initiate said action.

* * * * *